W. E. KING.
WHEEL LUBRICATOR.
APPLICATION FILED APR. 16, 1914.
1,163,414.
Patented Dec. 7, 1915.
2 SHEETS—SHEET 1.
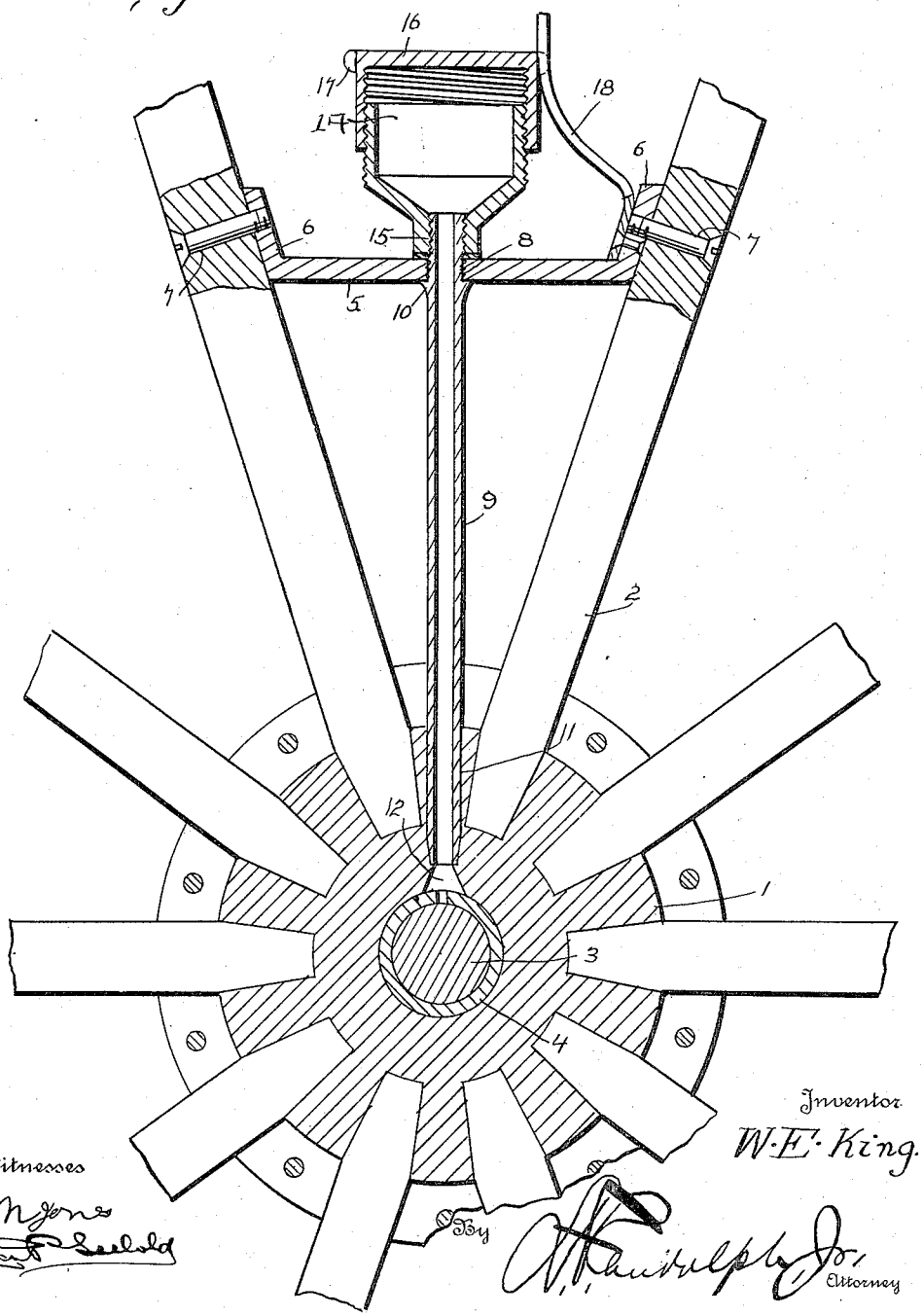

W. E. KING.
WHEEL LUBRICATOR.
APPLICATION FILED APR. 16, 1914.
1,163,414.
Patented Dec. 7, 1915.
2 SHEETS—SHEET 2.
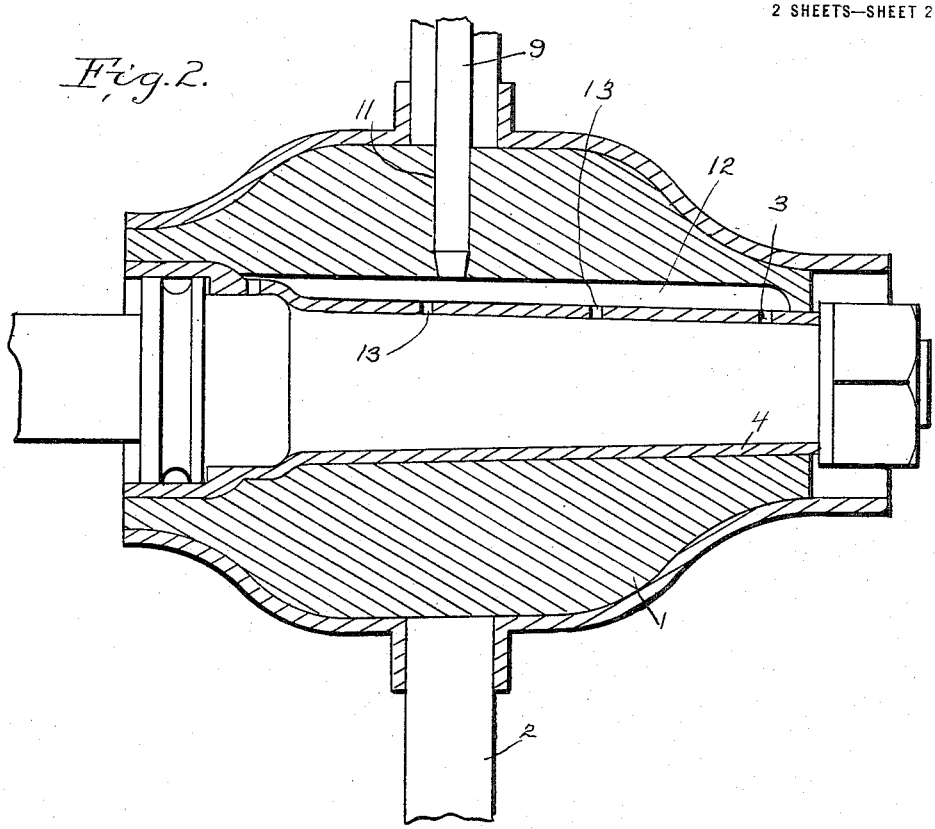
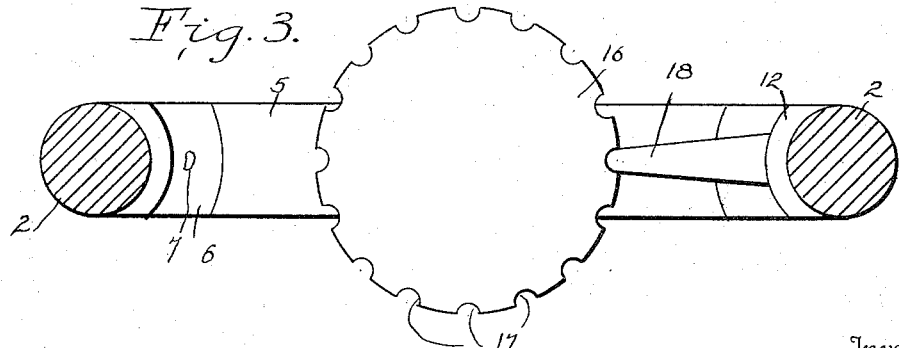
Witnesses
Inventor
W. E. King

UNITED STATES PATENT OFFICE.

WILLIAM E. KING, OF GREENVILLE, SOUTH CAROLINA, ASSIGNOR OF ONE-FOURTH TO ANDREW J. WESTMORELAND, OF BAILEY, NORTH CAROLINA.

WHEEL-LUBRICATOR.

1,163,414. Specification of Letters Patent. Patented Dec. 7, 1915.

Application filed April 16, 1914. Serial No. 832,316.

*To all whom it may concern:*

Be it known that I, WILLIAM E. KING, a citizen of the United States, residing at Greenville, in the county of Greenville and State of South Carolina, have invented certain new and useful Improvements in Wheel-Lubricators, of which the following is a specification.

This invention relates to lubricators and has for its object to provide a simple and efficient lubricating device for wheel axle spindles of vehicles.

With this and other objects in view, the invention consists in the novel construction, arrangement and combination of parts as will be hereinafter specifically described, claimed and illustrated in the accompanying drawings, in which, Figure 1 represents a sectional view, partly broken away, of a vehicle wheel showing the application thereto of my improved lubricating device, Fig. 2 represents a sectional view through the hub of the wheel taken at right angles to Fig. 1, and, Fig. 3 represents a top plan view of the device as applied to use.

Referring to the drawing in detail, wherein similar reference numerals designate corresponding parts throughout the several views, the numeral 1 indicates the hub of an ordinary vehicle wheel having radiating spokes 2 rotatably mounted upon the axle spindle 3, a suitable boxing 4 being interposed between the spindle 3 and hub 1. A bracket consisting of a bar 5 having upwardly turned ends 6 is secured by bolts or screws 7 between two adjacent spokes 2 of the wheel. The medial portion of the bracket is formed with threaded aperture 8 receiving the threaded upper end of a supply pipe 9, having a shoulder formed thereon and abutting against the under side of said bracket. The opposite end of the supply pipe 9 is fitted into a bore formed radially through the hub 1 communicating with the axial bore thereof. The extreme inner end of the bore 11 terminates in a groove 12 formed in the wall of the axial bore of the hub. The portion of the boxing 4 adjacent the groove 12 is formed with a series of apertures 13 permitting the lubricant to gain access to the spindle 3. A cup 14 having a threaded opening 15 is engaged with the outer threaded end of the supply pipe 9 and secures the latter upon the bracket. The cup 14 is provided with exterior screw threads adapted to coöperate with the interior threads formed in the cap 15. An annular boss 16 is formed at the upper end of the cap 15 and provided with a plurality of notches 17. A spring locking arm 18 is secured at one end to one of the upturned extremities 6 of the bracket 5 and is bent so as to normally engage against the annular boss 16 of the cap. As shown in Fig. 1, the free end of the arm 18 is preferably extended in parallelism with the pipe 9 whereby the arm will be in proper position to engage within one of the notches 17 of the cap regardless of the position of said cap relative to the arm.

In operation, the cup 14 is adapted to be filled with axle or any kind of cup grease which is forced through the pipe 9 and into the groove 12 by screwing the cap 15 down upon the cup 14. The spring arm 18 will drop into one of the notches 17 and lock the cap 15 in adjusted position.

The walls of the groove 12 are preferably coated with varnish or a similar composition for preventing the oil or grease therein from soaking into the hub 1.

What I claim is:—

A wheel lubricator comprising a wheel having a hub, a bar having a central aperture and located between two spokes of the wheel, said bar having upwardly and outwardly extending attaching lugs formed at its ends and engaging the inner side of the spokes, fastening elements engaging the lugs and spokes, a feed pipe having its outer end passing through said aperture and having its inner end extending into the hub, a shoulder formed on the feed pipe and engaging the inner side of the bar, a cup secured to the outer end of the feed pipe and engaging the outer side of the bar, said shoulder and cup holding the pipe against movement with relation to the bar and wheel.

In testimony whereof I affix my signature in presence of two witnesses.

WILLIAM E. KING.

Witnesses:
 A. L. RITCHIE,
 O. B. MALERY.